US009777922B2

(12) United States Patent
Hegde et al.

(10) Patent No.: US 9,777,922 B2
(45) Date of Patent: Oct. 3, 2017

(54) SUBMERGED COMBUSTION BURNERS AND MELTERS, AND METHODS OF USE

(71) Applicant: JOHNS MANVILLE, Denver, CO (US)

(72) Inventors: Subray R Hegde, Littleton, CO (US); Narayana Rao Chalasani, Littleton, CO (US)

(73) Assignee: Johns Mansville, Denver, CO (US)

( * ) Notice: Subject to any disclaimer, the term of this patent is extended or adjusted under 35 U.S.C. 154(b) by 0 days.

(21) Appl. No.: 14/784,995

(22) PCT Filed: May 22, 2013

(86) PCT No.: PCT/US2013/042147
§ 371 (c)(1),
(2) Date: Oct. 16, 2015

(87) PCT Pub. No.: WO2014/189499
PCT Pub. Date: Nov. 27, 2014

(65) Prior Publication Data
US 2016/0076764 A1    Mar. 17, 2016

(51) Int. Cl.
F23D 17/00        (2006.01)
F23C 3/00         (2006.01)
(Continued)

(52) U.S. Cl.
CPC ............ *F23D 17/00* (2013.01); *C03B 5/2353* (2013.01); *C03B 5/2356* (2013.01); *F23C 3/004* (2013.01);
(Continued)

(58) Field of Classification Search
CPC .......... F23D 17/00; F23D 14/76; F23D 14/78; F23D 2900/00018; C03B 5/2353;
(Continued)

(56) References Cited

U.S. PATENT DOCUMENTS 1,706,857 A    3/1929 Mathe
2,174,533 A    10/1939 See et al.
(Continued)

FOREIGN PATENT DOCUMENTS

CN    202329916 U    7/2012
DE    37 10 244 A1    6/1989
(Continued)

OTHER PUBLICATIONS

"Glass Technologies—The Legacy of a Successful Public-Private Partnership", 2007, U.S. Department of Energy, pp. 1-32.
(Continued)

*Primary Examiner* — Queenie Dehghan
(74) *Attorney, Agent, or Firm* — Robert D. Touslee

(57) ABSTRACT

Submerged combustion burners having a burner body, a burner tip connected thereto. Submerged combustion melters including the burners and methods of using them to produce molten glass. The burner body has an external conduit and first and second internal conduits substantially concentric therewith, forming first and second annuli for passing a cooling fluid therethrough. The burner tip body is connected to the burner body at ends of the external and second internal conduits. The burner tip includes a generally central flow passage for a combustible mixture, the flow passage defined by an inner wall of the burner tip. The burner tip includes a crown portion defining a circumferential concavity.

17 Claims, 3 Drawing Sheets

(51) Int. Cl.
*F23D 14/76* (2006.01)
*F23D 14/78* (2006.01)
*C03B 5/235* (2006.01)

(52) U.S. Cl.
CPC ............ *F23D 14/76* (2013.01); *F23D 14/78* (2013.01); *C03B 2211/23* (2013.01); *C03B 2211/60* (2013.01); *F23D 2214/00* (2013.01); *F23D 2900/00018* (2013.01)

(58) Field of Classification Search
CPC . C03B 5/2356; C03B 211/23; C03B 211/602; F23C 3/004; F23F 2214/00
See application file for complete search history.

(56) References Cited

U.S. PATENT DOCUMENTS

| | | |
|---|---|---|
| 2,118,479 A | 1/1940 | McCaskey |
| 2,269,459 A | 1/1942 | Kleist |
| 2,321,480 A | 6/1943 | Gaskell |
| 2,432,942 A | 12/1947 | See et al. |
| 2,455,907 A | 1/1948 | Slayter |
| 2,679,749 A | 6/1954 | Poole |
| 2,718,096 A | 9/1955 | Henry et al. |
| 2,773,545 A | 12/1956 | Petersen |
| 2,781,756 A | 2/1957 | Kobe |
| 2,878,644 A | 3/1959 | Fenn |
| 2,890,166 A | 6/1959 | Heinze |
| 2,902,029 A | 9/1959 | Hill |
| 2,981,250 A | 4/1961 | Stewart |
| 3,020,165 A | 2/1962 | Davis |
| 3,056,283 A | 10/1962 | Tiede |
| 3,073,683 A | 1/1963 | Switzer et al. |
| 3,084,392 A | 4/1963 | Labino |
| 3,088,812 A | 5/1963 | Bitterlich et al. |
| 3,104,947 A | 9/1963 | Switzer et al. |
| 3,160,578 A | 12/1964 | Saxton et al. |
| 3,165,452 A | 1/1965 | Williams |
| 3,170,781 A | 2/1965 | Keefer |
| 3,174,820 A | 3/1965 | See et al. |
| 3,215,189 A | 11/1965 | Bauer |
| 3,224,855 A | 12/1965 | Plumat |
| 3,237,929 A | 3/1966 | Plumat et al. |
| 3,241,548 A | 3/1966 | See et al. |
| 3,248,205 A | 4/1966 | Dolf et al. |
| 3,260,587 A | 7/1966 | Dolf et al. |
| 3,268,313 A | 8/1966 | Burgman et al. |
| 3,285,834 A | 11/1966 | Guerrieri et al. |
| 3,294,512 A | 12/1966 | Penberthy |
| 3,325,298 A | 6/1967 | Brown |
| 3,339,616 A | 9/1967 | Ward, Jr. et al. |
| 3,347,660 A | 10/1967 | Smith et al. |
| 3,385,686 A | 5/1968 | Plumat et al. |
| 3,402,025 A | 9/1968 | Garrett et al. |
| 3,407,805 A | 10/1968 | Bougard |
| 3,407,862 A | 10/1968 | Mustian, Jr. |
| 3,421,873 A | 1/1969 | Burgman et al. |
| 3,432,399 A | 3/1969 | Schutt |
| 3,445,214 A | 5/1969 | Oremesher |
| 3,498,779 A | 3/1970 | Hathaway |
| 3,510,393 A | 5/1970 | Burgman et al. |
| 3,525,674 A | 8/1970 | Barnebey |
| 3,533,770 A | 10/1970 | Adler et al. |
| 3,563,683 A | 2/1971 | Hess |
| 3,592,151 A | 7/1971 | Webber |
| 3,592,623 A | 7/1971 | Shepherd |
| 3,606,825 A | 9/1971 | Johnson |
| 3,617,234 A | 11/1971 | Hawkins et al. |
| 3,627,504 A | 12/1971 | Johnson et al. |
| 3,692,017 A | 9/1972 | Glachant et al. |
| 3,717,139 A | 2/1973 | Guillet et al. |
| 3,738,792 A | 6/1973 | Feng |
| 3,746,527 A | 7/1973 | Knavish et al. |
| 3,747,588 A | 7/1973 | Booth |
| 3,754,879 A | 8/1973 | Phaneuf |
| 3,756,800 A | 9/1973 | Phaneuf |
| 3,763,915 A | 10/1973 | Perry et al. |
| 3,764,287 A | 10/1973 | Brocious |
| 3,771,988 A | 11/1973 | Starr |
| 3,818,893 A | 6/1974 | Kataoka et al. |
| 3,835,909 A | 9/1974 | Douglas et al. |
| 3,840,002 A | 10/1974 | Douglas et al. |
| 3,856,496 A | 12/1974 | Nesbitt et al. |
| 3,885,945 A | 5/1975 | Rees et al. |
| 3,907,585 A | 9/1975 | Francel et al. |
| 3,913,560 A | 10/1975 | Lazarre et al. |
| 3,951,635 A | 4/1976 | Rough |
| 3,976,464 A | 8/1976 | Wardlaw |
| 4,001,001 A | 1/1977 | Knavish et al. |
| 4,004,903 A | 1/1977 | Daman et al. |
| 4,083,711 A | 4/1978 | Jensen |
| 4,097,028 A | 6/1978 | Langhammer |
| 4,110,098 A | 8/1978 | Mattmuller |
| 4,153,438 A | 5/1979 | Stream |
| 4,185,982 A | 1/1980 | Schwenninger |
| 4,203,761 A | 5/1980 | Rose |
| 4,205,966 A | 6/1980 | Horikawa |
| 4,226,564 A | 10/1980 | Takahashi et al. |
| 4,238,226 A | 12/1980 | Sanzenbacher et al. |
| 4,249,927 A | 2/1981 | Fukuzaki et al. |
| 4,270,740 A | 6/1981 | Sanzenbacher et al. |
| 4,282,023 A | 8/1981 | Hammel et al. |
| 4,303,435 A | 12/1981 | Sleighter |
| 4,323,718 A | 4/1982 | Buhring et al. |
| 4,349,376 A | 9/1982 | Dunn et al. |
| 4,406,683 A | 9/1983 | Demarest |
| 4,413,882 A | 11/1983 | Bailey et al. |
| 4,488,537 A | 12/1984 | Laurent |
| 4,539,034 A | 9/1985 | Hanneken |
| 4,542,106 A | 9/1985 | Sproull |
| 4,545,800 A | 10/1985 | Won et al. |
| 4,622,007 A | 11/1986 | Gitman |
| 4,626,199 A | 12/1986 | Bounini |
| 4,632,687 A | 12/1986 | Kunkle et al. |
| 4,634,461 A | 1/1987 | Demarest, Jr. et al. |
| 4,657,586 A | 4/1987 | Masterson et al. |
| 4,735,642 A | 4/1988 | Jensen et al. |
| 4,738,938 A | 4/1988 | Kunkle et al. |
| 4,758,259 A | 7/1988 | Jensen |
| 4,798,616 A | 1/1989 | Knavish et al. |
| 4,814,387 A | 3/1989 | Donat |
| 4,816,056 A | 3/1989 | Tsai et al. |
| 4,877,436 A | 10/1989 | Sheinkop |
| 4,877,449 A | 10/1989 | Khinkis |
| 4,878,829 A | 11/1989 | Anderson |
| 4,882,736 A | 11/1989 | Pieper |
| 4,919,700 A | 4/1990 | Pecoraro et al. |
| 4,927,886 A | 5/1990 | Backderf et al. |
| 4,953,376 A | 9/1990 | Merlone |
| 5,032,230 A | 7/1991 | Shepherd |
| 5,052,874 A | 10/1991 | Johanson |
| 5,062,789 A | 11/1991 | Gitman |
| 5,097,802 A | 3/1992 | Clawson |
| 5,168,109 A | 12/1992 | Backderf et al. |
| 5,169,424 A | 12/1992 | Grinnen et al. |
| 5,199,866 A | 4/1993 | Joshi et al. |
| 5,204,082 A | 4/1993 | Schendel |
| 5,261,602 A * | 11/1993 | Brent ..................... C01B 3/363 |
| | | 110/347 |
| 5,299,929 A | 4/1994 | Yap |
| 5,360,171 A | 11/1994 | Yap |
| 5,374,595 A | 12/1994 | Dumbaugh et al. |
| 5,405,082 A | 4/1995 | Brown et al. |
| 5,449,286 A | 9/1995 | Snyder et al. |
| 5,483,548 A | 1/1996 | Coble |
| 5,490,775 A | 2/1996 | Joshi et al. |
| 5,522,721 A | 6/1996 | Drogue et al. |
| 5,545,031 A | 8/1996 | Joshi et al. |
| 5,575,637 A | 11/1996 | Slavejkov et al. |
| 5,595,703 A | 1/1997 | Swaelens et al. |
| 5,606,965 A | 3/1997 | Panz et al. |
| 5,613,994 A | 3/1997 | Muniz et al. |
| 5,636,623 A | 6/1997 | Panz et al. |
| 5,672,827 A | 9/1997 | Jursich |

(56) References Cited

U.S. PATENT DOCUMENTS

| | | | |
|---|---|---|---|
| 5,713,668 A | 2/1998 | Lunghofer et al. |
| 5,718,741 A | 2/1998 | Hull et al. |
| 5,736,476 A | 4/1998 | Warzke et al. |
| 5,743,723 A | 4/1998 | Iatrides et al. |
| 5,765,964 A | 6/1998 | Calcote et al. |
| 5,814,121 A | 9/1998 | Travis |
| 5,829,962 A | 11/1998 | Drasek et al. |
| 5,833,447 A | 11/1998 | Bodelin et al. |
| 5,849,058 A | 12/1998 | Takeshita et al. |
| 5,863,195 A | 1/1999 | Feldermann |
| 5,944,507 A | 8/1999 | Feldermann |
| 5,944,864 A | 8/1999 | Hull et al. |
| 5,954,498 A | 9/1999 | Joshi et al. |
| 5,975,886 A | 11/1999 | Phillippe |
| 5,979,191 A | 11/1999 | Jian |
| 5,984,667 A | 11/1999 | Phillippe et al. |
| 5,993,203 A | 11/1999 | Koppang |
| 6,029,910 A | 2/2000 | Joshi et al. |
| 6,036,480 A | 3/2000 | Hughes et al. |
| 6,039,787 A | 3/2000 | Edlinger |
| 6,045,353 A | 4/2000 | VonDrasek et al. |
| 6,068,468 A | 5/2000 | Phillippe et al. |
| 6,071,116 A | 6/2000 | Phillippe et al. |
| 6,074,197 A | 6/2000 | Phillippe |
| 6,077,072 A | 6/2000 | Marin et al. |
| 6,085,551 A | 7/2000 | Pieper et al. |
| 6,109,062 A | 8/2000 | Richards |
| 6,113,389 A | 9/2000 | Joshi et al. |
| 6,116,896 A | 9/2000 | Joshi et al. |
| 6,120,889 A | 9/2000 | Turner et al. |
| 6,123,542 A | 9/2000 | Joshi et al. |
| 6,126,438 A | 10/2000 | Joshi et al. |
| 6,154,481 A | 11/2000 | Sorg et al. |
| 6,156,285 A | 12/2000 | Adams et al. |
| 6,171,100 B1 | 1/2001 | Joshi et al. |
| 6,183,848 B1 | 2/2001 | Turner et al. |
| 6,210,151 B1 | 4/2001 | Joshi et al. |
| 6,210,703 B1 | 4/2001 | Novich |
| 6,237,369 B1 | 5/2001 | LeBlanc et al. |
| 6,241,514 B1 | 6/2001 | Joshi et al. |
| 6,244,197 B1 | 6/2001 | Coble |
| 6,244,857 B1 | 6/2001 | VonDrasek et al. |
| 6,247,315 B1 | 6/2001 | Marin et al. |
| 6,250,136 B1 | 6/2001 | Igreja |
| 6,250,916 B1 | 6/2001 | Phillippe et al. |
| 6,274,164 B1 | 8/2001 | Novich |
| 6,276,924 B1 | 8/2001 | Joshi et al. |
| 6,276,928 B1 | 8/2001 | Joshi et al. |
| 6,293,277 B1 | 9/2001 | Panz et al. |
| 6,314,760 B1 | 11/2001 | Chenoweth |
| 6,314,896 B1 | 11/2001 | Marin et al. |
| 6,338,337 B1 | 1/2002 | Panz et al. |
| 6,344,747 B1 | 2/2002 | Lunghofer et al. |
| 6,357,264 B1 | 3/2002 | Richards |
| 6,386,271 B1 | 5/2002 | Kawamoto et al. |
| 6,418,755 B2 | 7/2002 | Chenoweth |
| 6,422,041 B1 | 7/2002 | Simpson et al. |
| 6,454,562 B1 | 9/2002 | Joshi et al. |
| 6,460,376 B1 | 10/2002 | Jeanvoine et al. |
| 6,536,651 B2 | 3/2003 | Ezumi et al. |
| 6,558,606 B1 | 5/2003 | Kulkarni et al. |
| 6,660,106 B1 | 12/2003 | Babel et al. |
| 6,694,791 B1 | 2/2004 | Johnson et al. |
| 6,701,617 B2 | 3/2004 | Li et al. |
| 6,705,118 B2 | 3/2004 | Simpson et al. |
| 6,708,527 B1 | 3/2004 | Ibarlucea et al. |
| 6,711,942 B2 | 3/2004 | Getman et al. |
| 6,715,319 B2 | 4/2004 | Barrow et al. |
| 6,722,161 B2 | 4/2004 | LeBlanc |
| 6,736,129 B1 | 5/2004 | Smith |
| 6,739,152 B2 | 5/2004 | Jeanvoine et al. |
| 6,796,147 B2 | 9/2004 | Borysowicz et al. |
| 6,797,351 B2 | 9/2004 | Kulkarni et al. |
| 6,854,290 B2 | 2/2005 | Hayes et al. |
| 6,857,999 B2 | 2/2005 | Jeanvoine |
| 6,883,349 B1 | 4/2005 | Jeanvoine |
| 6,892,654 B2 * | 5/2005 | Whittaker ............... C10J 3/506 110/260 |
| 6,918,256 B2 | 7/2005 | Gutmark et al. |
| 7,027,467 B2 | 4/2006 | Baev et al. |
| 7,116,888 B1 | 10/2006 | Aitken et al. |
| 7,134,300 B2 | 11/2006 | Hayes et al. |
| 7,168,395 B2 | 1/2007 | Engdahl |
| 7,175,423 B1 | 2/2007 | Pisano et al. |
| 7,231,788 B2 | 6/2007 | Karetta et al. |
| 7,273,583 B2 | 9/2007 | Rue et al. |
| 7,383,698 B2 | 6/2008 | Ichinose et al. |
| 7,392,668 B2 | 7/2008 | Adams et al. |
| 7,428,827 B2 | 9/2008 | Maugendre et al. |
| 7,441,686 B2 | 10/2008 | Odajima et al. |
| 7,448,231 B2 | 11/2008 | Jeanvoine et al. |
| 7,454,925 B2 | 11/2008 | DeAngelis et al. |
| 7,509,819 B2 | 3/2009 | Baker et al. |
| 7,565,819 B2 | 7/2009 | Jeanvoine et al. |
| 7,578,988 B2 | 8/2009 | Jacques et al. |
| 7,581,948 B2 | 9/2009 | Borders et al. |
| 7,622,677 B2 | 11/2009 | Barberree et al. |
| 7,624,595 B2 | 12/2009 | Jeanvoine et al. |
| 7,748,592 B2 | 7/2010 | Koga et al. |
| 7,767,606 B2 | 8/2010 | McGinnis et al. |
| 7,778,290 B2 | 8/2010 | Sacks et al. |
| 7,781,562 B2 | 8/2010 | Crawford et al. |
| 7,802,452 B2 | 9/2010 | Borders et al. |
| 7,832,365 B2 | 11/2010 | Hannum et al. |
| 7,845,314 B2 | 12/2010 | Smith |
| 7,855,267 B2 | 12/2010 | Crawford et al. |
| 8,033,254 B2 | 10/2011 | Hannum et al. |
| 8,279,899 B2 | 10/2012 | Kitabayashi |
| 8,285,411 B2 | 10/2012 | Hull et al. |
| 8,707,739 B2 | 4/2014 | Huber et al. |
| 9,096,453 B2 | 8/2015 | Charbonneau |
| 2002/0086077 A1 | 7/2002 | Noller et al. |
| 2002/0134112 A1 | 9/2002 | Barrow et al. |
| 2002/0152770 A1 | 10/2002 | Becher et al. |
| 2002/0162358 A1 | 11/2002 | Jeanvoine et al. |
| 2002/0166343 A1 | 11/2002 | LeBlanc |
| 2003/0015000 A1 | 1/2003 | Hayes et al. |
| 2003/0029197 A1 | 2/2003 | Jeanvoine et al. |
| 2003/0037571 A1 | 2/2003 | Kobayashi et al. |
| 2003/0075843 A1 | 4/2003 | Wunsche |
| 2004/0131988 A1 | 7/2004 | Baker et al. |
| 2004/0168474 A1 | 9/2004 | Jeanvoine et al. |
| 2004/0224833 A1 | 11/2004 | Jeanvoine et al. |
| 2005/0026099 A1 | 2/2005 | Masi et al. |
| 2005/0039491 A1 | 2/2005 | Maugendre et al. |
| 2005/0083989 A1 | 4/2005 | Leister et al. |
| 2005/0103323 A1 | 5/2005 | Engdahl |
| 2005/0236747 A1 | 10/2005 | Rue et al. |
| 2006/0000239 A1 | 1/2006 | Jeanvoine et al. |
| 2006/0174655 A1 | 8/2006 | Kobayashi et al. |
| 2006/0233512 A1 | 10/2006 | Aitken et al. |
| 2006/0257097 A1 | 11/2006 | Aitken et al. |
| 2006/0287482 A1 | 12/2006 | Crawford et al. |
| 2006/0293494 A1 | 12/2006 | Crawford et al. |
| 2006/0293495 A1 | 12/2006 | Crawford et al. |
| 2007/0106054 A1 | 5/2007 | Crawford et al. |
| 2007/0122332 A1 | 5/2007 | Jacques et al. |
| 2007/0130994 A1 | 6/2007 | Boratav et al. |
| 2007/0212546 A1 | 9/2007 | Jeanvoine et al. |
| 2007/0220922 A1 | 9/2007 | Bauer et al. |
| 2007/0246869 A1 | 10/2007 | Rymarchyk et al. |
| 2008/0035078 A1 | 2/2008 | Li |
| 2008/0227615 A1 | 9/2008 | McGinnis et al. |
| 2008/0256981 A1 | 10/2008 | Jacques et al. |
| 2008/0276652 A1 | 11/2008 | Bauer et al. |
| 2008/0293857 A1 | 11/2008 | Crawford et al. |
| 2009/0042709 A1 | 2/2009 | Jeanvoine et al. |
| 2009/0220899 A1 | 9/2009 | Spangelo et al. |
| 2010/0064732 A1 | 3/2010 | Jeanvoine et al. |
| 2010/0087574 A1 | 4/2010 | Crawford et al. |
| 2010/0089383 A1 | 4/2010 | Cowles |
| 2010/0120979 A1 | 5/2010 | Crawford et al. |
| 2010/0143601 A1 | 6/2010 | Hawtof et al. |
| 2010/0227971 A1 | 9/2010 | Crawford et al. |

(56) References Cited

U.S. PATENT DOCUMENTS

| | | |
|---|---|---|
| 2010/0236323 A1 | 9/2010 | D'Angelico et al. |
| 2010/0300153 A1 | 12/2010 | Zhang et al. |
| 2010/0304314 A1 | 12/2010 | Rouchy et al. |
| 2010/0307196 A1 | 12/2010 | Richardson |
| 2010/0326137 A1 | 12/2010 | Rouchy et al. |
| 2011/0054091 A1 | 3/2011 | Crawford et al. |
| 2011/0061642 A1 | 3/2011 | Rouchy et al. |
| 2011/0088432 A1 | 4/2011 | Purnode et al. |
| 2011/0107670 A1 | 5/2011 | Galley et al. |
| 2011/0236846 A1 | 9/2011 | Rue et al. |
| 2011/0308280 A1 | 12/2011 | Huber |
| 2012/0077135 A1 | 3/2012 | Charbonneau |
| 2012/0132725 A1 | 5/2012 | Dinu |
| 2013/0086944 A1 | 4/2013 | Shock et al. |
| 2013/0086949 A1 | 4/2013 | Charbonneau |
| 2013/0086950 A1 | 4/2013 | Huber et al. |
| 2013/0086951 A1 | 4/2013 | Charbonneau et al. |
| 2013/0086952 A1 | 4/2013 | Charbonneau et al. |
| 2013/0137051 A1 | 5/2013 | Beyer et al. |
| 2013/0283861 A1 | 10/2013 | Mobley et al. |

FOREIGN PATENT DOCUMENTS

| | | |
|---|---|---|
| DE | 196 19 919 A1 | 8/1997 |
| DE | 100 29 983 C2 | 9/2003 |
| DE | 103 27 201 A1 | 1/2005 |
| DE | 10 2005 033330 B3 | 8/2006 |
| DE | 10 2006 006572 A1 | 7/2009 |
| EP | 0 181 248 B1 | 10/1989 |
| EP | 1 337 789 E1 | 12/2004 |
| EP | 1 990 321 A1 | 11/2008 |
| EP | 2 133 315 A1 | 12/2009 |
| EP | 1 986 966 81 | 4/2010 |
| EP | 1 677 934 B1 | 2/2011 |
| FR | 2 740 860 A1 | 9/1997 |
| GB | 191407633 | 0/1914 |
| GB | 191301772 | 1/1914 |
| GB | 164073 A | 5/1921 |
| IT | 1208172 | 7/1989 |
| JP | S58 199728 A | 11/1983 |
| JP | S61 9901 7 A | 5/1986 |
| RO | 114827 | 7/1999 |
| WO | 9855411 A1 | 12/1998 |
| WO | 2008103291 A1 | 8/2008 |
| WO | 2009091558 A1 | 7/2009 |
| WO | 2010011701 A2 | 1/2010 |
| WO | 2010045196 A3 | 4/2010 |
| WO | 2010147188 A1 | 12/2010 |
| WO | 20120122490 | 5/2012 |

OTHER PUBLICATIONS

"Glass Melting Technology—A Technical and Economic Assessment," 2004, U.S. Department of Energy, pp. 1-292.

Rue, "Energy-Efficient Glass Melting—The Next Generation Melter", Gas Technology Institute, Project No. 20621 Final Report (2008).

"Glass industry of the Future", United States Department of Energy, report 02-GA50113-03, pp. 1-17, Sep. 30, 2008.

Furman, BJ, ME 120 Experimental Methods Vibration Measurement, San Jose University Department of Mechanical and Aerospace Engineering.

Higley, BA, Glass Melter System Technologies for Vitrification of High-Sodium Content Low-Level, Radioactive, Liquid Wastes—Phase I: SBS Demonstration With Simulated Low-Level Waste—Final Test Report, Westinghouse Hanford Company.

Report for Treating Hanford LAW and WTP SW Simulants: Pilot Plant Mineralizing Flowsheet Apr. 2009, Department of Energy Environmental Management Consolidated Business Center by THOR Treatment Technologies, LLC.

Olabin, V.M. et al, "Submerged Combustion Furnace for Glass Melts," Ceramic Engineering arid Science Proceedings, Jan. 1, 1996, pp. 84-92, vol. 17—No. 2, American Ceramic Society Inc., US.

* cited by examiner

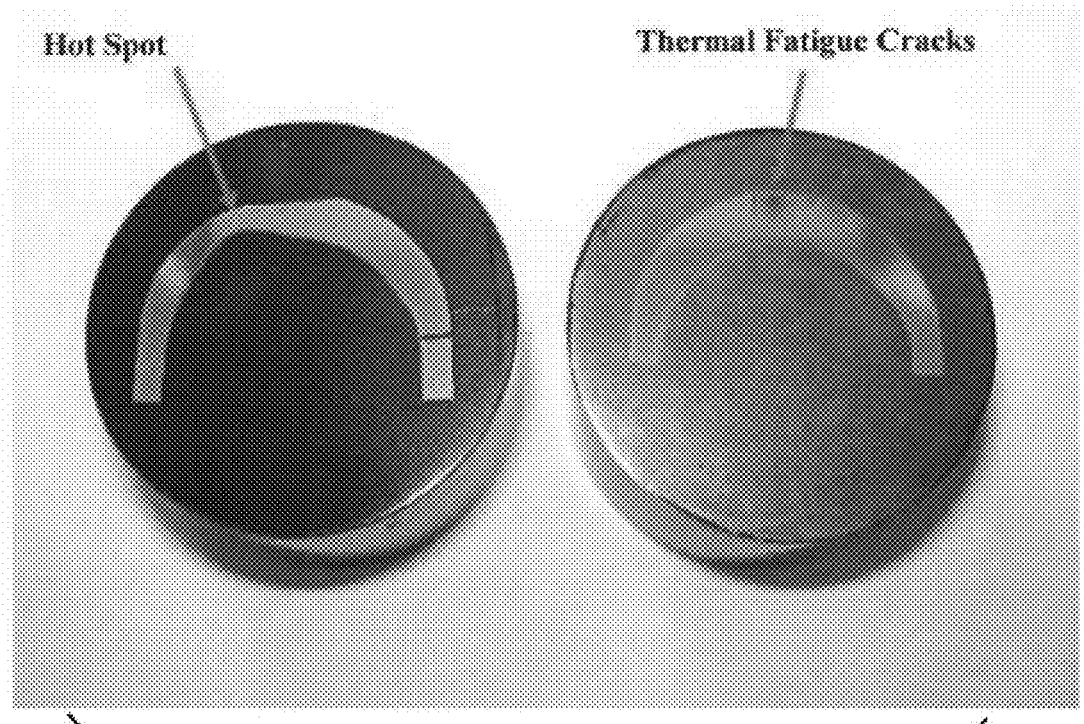
FIG. 3
(Prior Art)
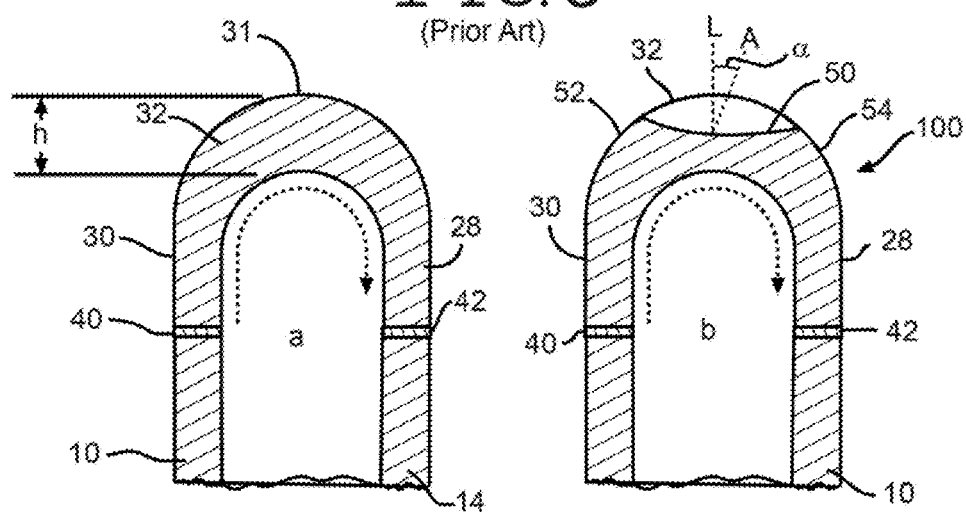
FIG. 4A
(Prior Art)
FIG. 4B

SUBMERGED COMBUSTION BURNERS AND MELTERS, AND METHODS OF USE

BACKGROUND INFORMATION

Technical Field

The present disclosure relates generally to the field of combustion burners and methods of use, and more specifically to burners, submerged combustion melters, and methods of their use, particularly for melting glass-forming materials.

Background Art

A submerged combustion melter (SCM) may be employed to melt glass batch and/or waste glass materials to produce molten glass by passing oxygen, oxygen-enriched mixtures, or air along with a liquid, gaseous and/or particulate fuel (some of which may be in the glass-forming materials), directly into a molten pool of glass, usually through burners submerged in a glass melt pool. The introduction of high flow rates of products of combustion of the oxidant and fuel into the molten glass, and the expansion of the gases during submerged combustion (SC), cause rapid melting of the glass batch and much turbulence.

In the context of SCMs, known oxy-fuel burners are predominately water-cooled, nozzle mix designs and avoid premixing for safety reasons due to the increased reactivity of using oxygen as the oxidant versus air. One currently used submerged combustion burner employs a smooth exterior surface, half-toroid metallic burner tip of the same or similar material as the remainder of the burner. When operating an SCM with burners of this nature, the combustion burner tips are exposed to a glass and combustion gas environment high and oscillating temperatures. The burner can be designed so that the oxidant (typically oxygen) or fuel flow cools the inner wall of the burner tip before combustion occurs, but the flow cannot provide cooling to the top crown and outer wall of the burner tip. Although cooling water or other coolant is typically applied to cool the burner tip, the temperatures are extremely high for typical metal alloys when the hot glass (2500+° F. (1,370+° C.)) or combustion products (up to 4000° F. (2,190° C.) contact the burner tip. Also, since the burner tip section temperature is oscillating with the combustion bubble growth, the burner tip experiences frequent rapid temperature change. Therefore, burner life can be very short due to the failure of the materials used to form the burner tip.

Failure analysis of used SCM burner tips identified thermal fatigue cracking and hot spot formation in the toroid burner tip as two important modes of burner failure. Hot spots may form during the operation, likely due to partial plugging of the burner, which may direct combustion flame toward one side of the burner and cause localized heating or hot spot formation. This situation leads to rapid localized oxidation of the burner tip material, and consequent reduction in wall thickness of the burner tip. Thermal fatigue may be problematic because, for the most part, portions of the burner tip remain exposed to turbulent molten glass, while other portions are exposed to gaseous combustion mixture (for example natural gas and oxygen). Furthermore, while the burner tip is exposed to rapidly fluctuating temperature and loading conditions, lower portions of the burner tip, and the burner body below the burner tip, are immobilized by the refractory liner and steel shell of the melter. Being confined, the burner tip experiences a repetitive thermal stress pattern. Additionally, temperature gradients across the burner tip wall thickness cause thermal stresses at the apex of the burner tip crown. It is also known that film boiling occurs at the internal water-cooled surface of the burner tip (U-turn) causing rapid fluctuations in the thermal gradient across the burner wall thickness at the toroid shaped tip. It is believed this challenging service condition causes thermal fatigue failure of the burner by forming multiple and mostly radial cracks at the burner tip.

The hot spot formation can be addressed by suitably increasing the wall thickness. However, addressing the thermal fatigue issue (caused by temperature gradient dependent thermal stress) requires reduced wall thickness. While lower wall thickness (with reduced thermal gradient) extends fatigue crack initiation life, higher wall thickness favors crack propagation life. These contradictory requirements make it extremely challenging to design future burners for superior service life.

Development of submerged combustion burners having longer life and less susceptibility to the SCM environment while melting glass-forming materials would be a significant advance in the submerged combustion art.

SUMMARY

In accordance with the present disclosure, submerged combustion (SC) burners, melters including at least one of the submerged combustion burners, and methods of using the melters to produce molten glass are described that may reduce or eliminate problems with known SC burners, melters, and methods.

A first aspect of the disclosure is a fluid-cooled burner comprising:

a burner body (6) comprising an external conduit (10) and a first internal conduit (12) substantially concentric therewith, and positioned internal of the external conduit (10), the external conduit (10) comprising a first end, a second end, and a longitudinal bore having a longitudinal axis, the first internal conduit (12) comprising a first end, a second end, and a longitudinal bore having a longitudinal axis, and a second internal conduit (14) substantially concentric with, and positioned internal of the first internal conduit, the second internal conduit (14) comprising a first end, a second end, and a longitudinal bore having a longitudinal axis, the external conduit (10) and first internal conduit (12) forming a first annulus (11) there between for passing a cooling fluid, the first internal conduit (12) and the second internal conduit (14) forming a second annulus (13) there between for passing the cooling fluid, and a third internal conduit (15) configured to form a third annulus between the second (14) and third (15) internal conduits, the burner body comprising fuel and oxidant inlet ports near the second ends of the conduits; and a burner tip (4) defined by an inner wall (28) and an outer wall (30) connected via a crown (32), the outer wall (30) removably fixed to the first end of the external conduit (10) via an outer connection, and the inner wall (28) removably fixed to the first end of the second internal conduit (14) via an inner connection, the burner tip (4) comprising a generally central burner tip flow passage configured to pass a combustible mixture therethrough, the generally central burner tip flow passage defined by the inner wall (28); and wherein the burner tip crown (32) comprises a first portion defining a circumferential concavity (50) having a curvature orientation, and second and third portions defining inner and outer crown rims (52, 54), at least the outer crown rim (54) extending above the circumferential concavity (50). Optionally, the burner tip crown (32) and inner (28) and outer (30) walls may comprise the same or different corrosion resistant and fatigue resistant material, at least one of the corrosion and/or fatigue resistance being greater than material comprising the external conduit (10) under conditions experienced during submerged combustion melting of glass-forming materials.

A second aspect of the disclosure is a submerged combustion melter comprising:

a floor, a roof, and a sidewall structure connecting the floor and roof defining an internal space, at least a portion of the internal space comprising a melting zone; and one or more combustion burners in either the floor, the roof, the sidewall structure, or any two or more of these, producing combustion gases and configured to emit the combustion gases from a position under a level of, and positioned to transfer heat to and produce a turbulent molten mass of glass in the melting zone, at least one of the combustion burners being a fluid-cooled combustion burner as described herein.

A third aspect of the disclosure are methods of producing molten glass comprising feeding glass-forming materials to a submerged combustion melter including at least one fluid-cooled combustion burner as described herein, feeding an oxidant and a fuel to the burner, combusting the fuel and oxidant, and melting the glass-forming materials to produce molten glass.

Certain methods within the disclosure include methods wherein the fuel may be a substantially gaseous fuel selected from the group consisting of methane, natural gas, liquefied natural gas, propane, carbon monoxide, hydrogen, steam-reformed natural gas, atomized oil or mixtures thereof, and the oxidant may be an oxygen stream comprising at least 90 mole percent oxygen.

Burners, melters, and methods of the disclosure will become more apparent upon review of the brief description of the drawings, the detailed description of the disclosure, and the claims that follow.

BRIEF DESCRIPTION OF THE DRAWINGS

The manner in which the objectives of the disclosure and other desirable characteristics can be obtained is explained in the following description and attached schematic drawings in which:

FIG. 3 shows cross-sectional views of two used SC burner tips, one showing a hot spot, and the other showing thermal fatigue cracks;

FIG. 4A is a longitudinal cross-sectional view of a portion of a prior art SC burner, and FIG. 4B is a longitudinal cross-sectional view of a portion of an SC burner in accordance with the present disclosure.

Figure 1:
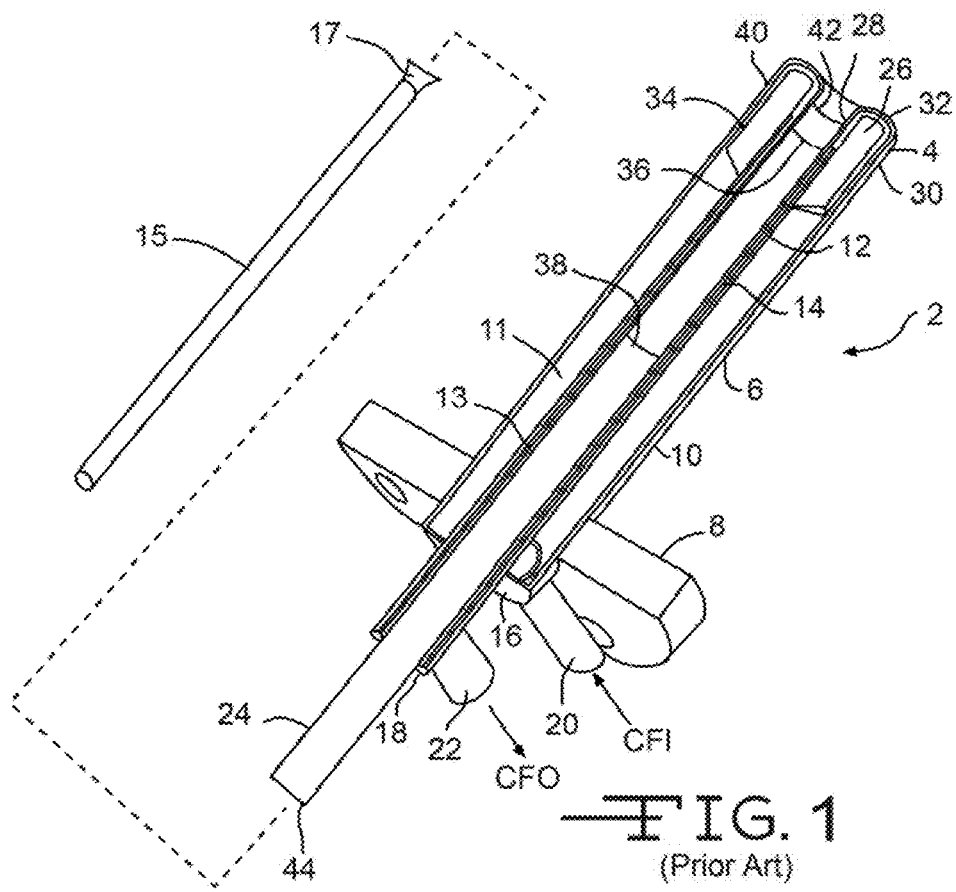
FIG. 1 is a longitudinal cross-section view of fluid-cooled portions of a prior art SC burner and burner tip, illustrating a central, substantially concentric fuel or oxidant conduit (not shown in all other figures)

It is to be noted, however, that the appended drawings are schematic only, may not be to scale, illustrate only typical embodiments of this disclosure, and are therefore not to be considered limiting of its scope, for the disclosure may admit to other equally effective embodiments.

DETAILED DESCRIPTION

In the following description, numerous details are set forth to provide an understanding of the disclosed apparatus and methods. However, it will be understood by those skilled in the art that the apparatus and methods covered by the claims may be practiced without these details and that numerous variations or modifications from the specifically described embodiments may be possible and are deemed within the claims. All U.S. published patent applications and U.S. Patents referenced herein are hereby explicitly incorporated herein by reference. In the event definitions of terms in the referenced patents and applications conflict with how those terms are defined in the present application, the definitions for those terms that are provided in the present application shall be deemed controlling. All percentages herein are based on weight unless otherwise specified.

As explained briefly in the Background, in present SC burners employing a metallic burner tip, although coolant is typically applied to cool SC burner tips, the extremely high temperature molten glass and combustion gases contact the outer wall and crown of the burner tip. In this environment the burner tip temperature in these regions oscillates with the combustion gas bubble growth and burst cycle. Thus, the burner tip experiences not only extremely high temperatures, but also frequent rapid temperature change. Hot spots may form, perhaps due to partial plugging of the burner, which may direct combustion flame toward one side of the burner and cause localized heating or hot spot formation. This situation may lead to rapid localized oxidation of the burner tip material, and consequent reduction in wall thickness of the burner tip. Thermal fatigue may be problematic because, for the most part, portions of the burner tip remain exposed to turbulent molten glass, while other portions are exposed to gaseous combustion mixture. Furthermore, while the burner tip is exposed to rapidly fluctuating temperature and loading conditions, lower portions of the burner tip, and portions of the burner body below the burner tip, are immobilized by the refractory liner and steel shell of the melter. Being confined, the burner tip experiences a repetitive thermal stress pattern. Additionally, temperature gradients across the burner tip wall thickness cause thermal stresses at the apex of the burner tip crown. Therefore, burner life can be very short due to the failure of the materials used to form the burner tip.

The SC burners of the present disclosure solve this problem by providing a burner tip comprising a first portion defining a circumferential concavity facing generally away from the burner body, and second and third portions defining inner and outer crown rims, at least the outer crown rim extending above the first portion, the concavity having a curvature orientation as further explained herein. SC burners of the present disclosure invoke a geometrical change in the toroid shaped burner tip for favorably shifting the peak stress spot and distributing the stress over a wider area for extended fatigue life without compromising on the event of burner hot spot formation.

FIG. 1 illustrates schematically a prior art SC burner having a fluid-cooled portion 2 composed of a burner tip 4 attached to a burner body 6. A burner main flange 8 connects the burner to an SCM superstructure, not illustrated. Burner body 6 comprises an external conduit 10, a first internal conduit 12, a second internal conduit 14, and end plates 16, 18. A coolant fluid inlet conduit 20 is provided, along with a coolant fluid exit conduit 22, allowing ingress of a cool coolant fluid as indicated by the arrow denoted "CFI", and warmed coolant fluid egress, as indicated by an arrow denoted "CFO", respectively. A first annulus 11 is thus formed between substantially concentric external conduit 10 and first internal conduit 12, and a second annulus 13 is formed between substantially concentric first and second internal conduits 12, 14. A proximal end 24 of second internal conduit 14 may be sized to allow insertion of a fuel or oxidant conduit 15 (depending on the burner arrangement), which may or may not include a distal end nozzle 17. When conduit 15 and optional nozzle 17 are inserted internal of second internal conduit 14, a third annulus is formed there between. In certain embodiments, oxidant flows through the third annulus, entering through a port 44, while one or more fuels flow through conduit 15. In certain other embodiments, one or more fuels flow through the third annulus, entering through port 44, while oxidant flows through conduit 15.

Still referring to FIG. 1, fluid-cooled portion 2 of the burner includes a ceramic or other material insert 26 fitted to the distal end of first internal conduit 12. Insert 26 has a shape similar to but smaller than burner tip 4, allowing coolant fluid to pass between burner tip 4 and insert 26, thus cooling burner tip 4. Burner tip 4 includes an inner wall 28, an outer wall 30, and a crown 32 connecting inner wall 28 and outer wall 30. In prior art burners, welds at locations 34 and 36, and optionally at 38, 40 and 42, connect burner tip 4 to external conduit 10 and second internal conduit 14, using conventional weld materials to weld together similar base metal parts, such as carbon steel, stainless steel, or titanium. Despite the use of coolant and even titanium (which ordinarily is considered quite corrosion-resistant), the operating life of SC burners as illustrated and described in relation to FIG. 1 are very limited in the SCM environment, where temperatures of molten glass may reach 1370° C., combustion products may reach 2,190° C., temperatures may oscillate 500° C. several times a second, and the turbulence of the molten glass caused by the combustion gases emanating from the burners themselves contribute to form a highly erosive environment in contact with the burner tip.

It has now been discovered that provision of a circumferential concavity in substantial portions or the entire burner tip crown not only reduces thermal fatigue, but reduces hot spot formation. This crown, and optionally careful selection of burner tip material and type of connections between the burner tip walls and conduits forming the burner body, may significantly increase the operating life of SC burners used to melt glass-forming materials in an SCM. Optionally, the burner tip crown and inner and outer walls may comprise the same or different corrosion resistant and fatigue resistant material, at least one of the corrosion and/or fatigue resistance being greater than material comprising the external conduit under conditions experienced during submerged combustion melting of glass-forming materials.

Various terms are used throughout this disclosure. "Submerged" as used herein means that combustion gases emanate from a combustion burner through the burner tip under the level of the molten glass; the burners may be floor-mounted, roof-mounted, wall-mounted, or in melter embodiments comprising more than one submerged combustion burner, any combination thereof (for example, two floor mounted burners and one wall mounted burner). "SC" as used herein means "submerged combustion" unless otherwise specifically noted, and "SCM" means submerged combustion melter unless otherwise specifically noted.

As used herein the phrase "combustion gases" as used herein means substantially gaseous mixtures comprised primarily of combustion products, such as oxides of carbon (such as carbon monoxide, carbon dioxide), oxides of nitrogen, oxides of sulfur, and water, as well as partially combusted fuel, non-combusted fuel, and any excess oxidant. Combustion products may include liquids and solids, for example soot and unburned liquid fuels.

"Oxidant" as used herein includes air ("air" includes gases having the same molar concentration of oxygen as air); oxygen-enriched air (air having oxygen concentration greater than 21 mole percent), and "pure" oxygen, such as industrial grade oxygen, food grade oxygen, electronic grade oxygen, and cryogenic oxygen. Oxygen-enriched air may have 50 mole percent or more oxygen, and in certain embodiments may be 90 mole percent or more oxygen.

The term "fuel", according to this disclosure, means a combustible composition comprising a major portion of, for example, methane, natural gas, liquefied natural gas, propane, hydrogen, steam-reformed natural gas, atomized hydrocarbon oil, combustible powders and other flowable solids (for example coal powders, carbon black, soot, and the like), and the like. Fuels useful in the disclosure may comprise minor amounts of non-fuels therein, including oxidants, for purposes such as premixing the fuel with the oxidant, or atomizing liquid or particulate fuels. As used herein the term "fuel" includes gaseous fuels, liquid fuels, flowable solids, such as powdered carbon or particulate material, waste materials, slurries, and mixtures or other combinations thereof.

The sources of oxidant and fuel may be one or more conduits, pipelines, storage facility, cylinders, or, in embodiments where the oxidant is air, ambient air. Oxygen-enriched oxidants may be supplied from a pipeline, cylinder, storage facility, cryogenic air separation unit, membrane permeation separator, or adsorption unit such as a vacuum swing adsorption unit.

Figure 2:
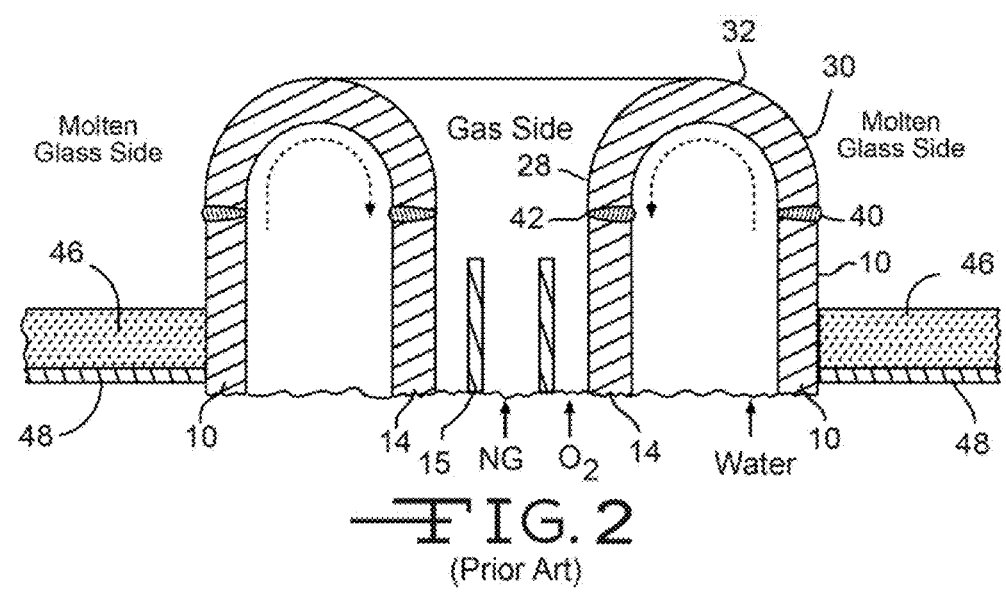
FIG. 2 is a longitudinal cross-sectional view of a portion of a prior art fluid-cooled SC burner and its typical position in a floor of an SCM.

FIG. 2 is a longitudinal cross-sectional view of a portion of a prior art fluid-cooled SC burner similar to that illustrated schematically in FIG. 1, illustrating one typical position in a floor of an SCM. In typical embodiments, the floor comprises refractory wall 46 and a metal shell 48. As may be seen in this view, substantial portions of the burner are immobilized in the floor (or wall, or roof) of the SCM, while the burner tip suffers the brunt of the challenging SCM environment.

FIG. 3 shows cross-sectional views of portions of two used SC burner tips, one showing a hot spot (left burner tip), and the other (right burner tip) showing thermal fatigue cracks. The burner tips were sectioned and then immersed in a thermosetting plastic material for viewing. Thumbnail fatigue crack propagation pattern indicated that the apex of the burner tip crown is one likely crack initiation spot. A finite element method ("FEM")-based thermal stress analysis of the burner indicated that the apex of crown 32 of the burner tip experiences severe thermal expansion stress during elevated temperature service due to differential heating of the burner tip and the shank region and also burner shank being confined and not allowed to flex. It was clear from the numerical simulation and the experimental failure analysis that the apex of the burner tip crown was the fracture critical location and that reducing the stress concentration at that location should be very effective in extending the thermal fatigue life of the burner.

Though original design called for uniform wall thickness (~2 mm) for the burner tip walls 28, 30 as well as crown 32, analysis of service-used burner tips that failed during operation had a thicker wall (~4 mm) at the burner tip crown 32 as illustrated schematically in the longitudinal cross-sectional view of FIG. 4A of a left-hand side of a prior art burner tip. It is theorized that this geometry aggravated the situation with increased stress concentration at the crown apex 31 due to increased thermal gradient. At the same, this thick section of the burner tip crown helped in catering to the hot spot formation. It was also noticed that hot spot formation most frequently occurred toward the glass side and never at the inside of apex 31.

Considering these observations, it was theorized that if the apex 31 of burner tip crown 32 was suitably truncated, the peak stress could be significantly reduced and distributed on either side of apex 31 of crown 32. An example of this is illustrated in embodiment 100 of FIG. 4B (again only depicting the left-hand portion of the burner tip). In certain embodiments, a portion 50 of crown 32 (or the entire crown 32) may have a circumferential concavity 50, as well as an inner rim portion 52 and an outer rim portion 54. In certain embodiments the idea is to construct a concave-shaped burner tip crown 32 for creating a gradually changing thermal gradient with a minimal value at the crown apex 31 for achieving more uniform stress distribution during burner operation. Apart from shifting the peak stress to the mounds or rim portions 52, 54 on either side of crown apex 31, this geometrical change should help in addressing the hot spot formation problem as well. Circumferential concavity 50 may have a curvature orientation "A" that may be at an orientation angle "α" with respect to longitudinal axis L of the burner tip (it being understood that the illustration in FIG. 4B shows the left-hand side of the burner tip, for example the left-hand side of FIG. 6). Angle α may range from 0 to about 45 degrees, or from about 5 to about 40 degrees, or from about 10 to about 30 degrees. Any range within the broad range may be used, for example from about 7 to 37 degrees, or from about 15 to about 32 degrees.

Figure 5:
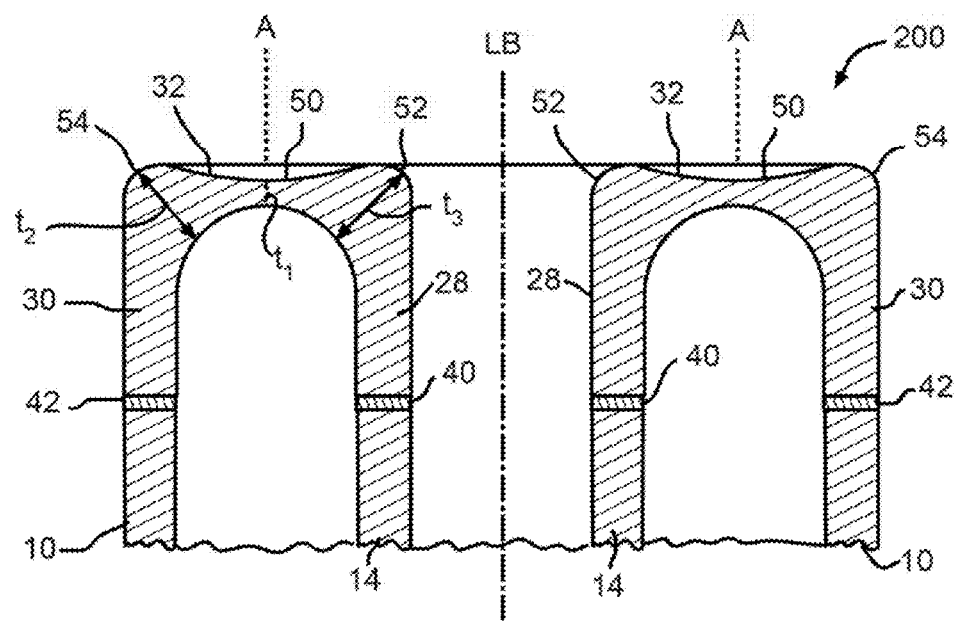
FIGS. 5 and 6 are longitudinal cross-sectional views two other SC burners in accordance with the present disclosure.
Figure 6:
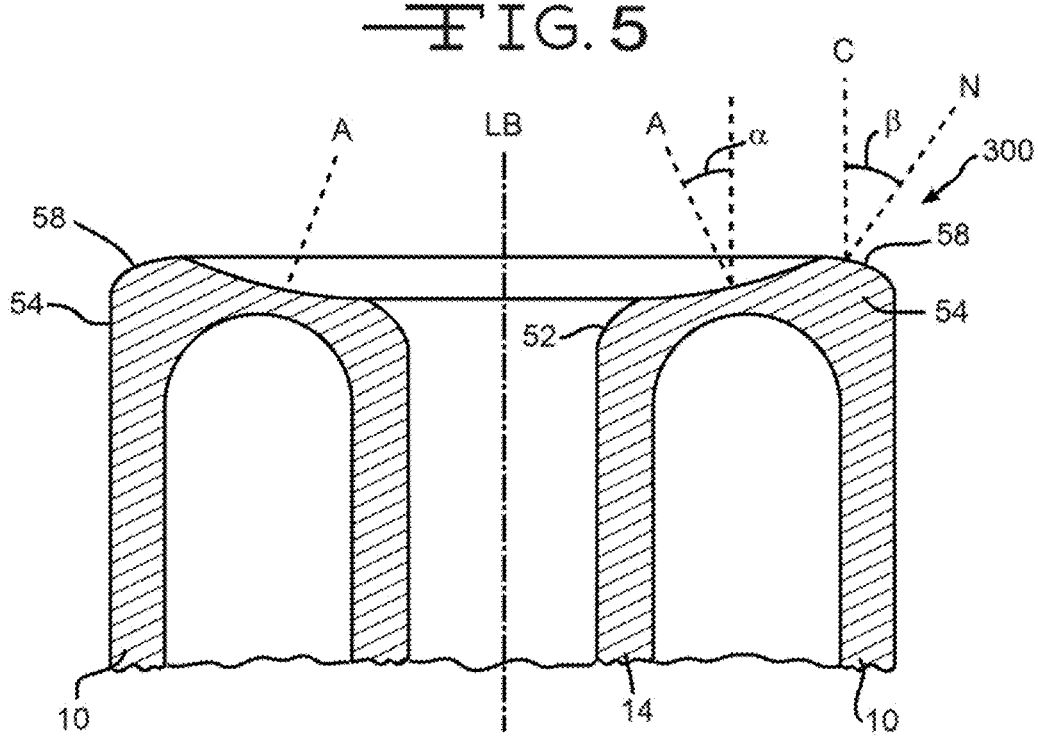

FIGS. 5 and 6 are longitudinal cross-sectional views of portions of two other SC burners embodiment 200 and 300 in accordance with the present disclosure. Though it is not expected to numerically halve the peak stress value, the concave burner tip embodiment 200 illustrated schematically in FIG. 5 should improve the stress distribution and the thicker sections should help in withstanding the formation of hot spots. Embodiment 200 also illustrates other dimensions of burner tips in accordance with the present disclosure, wherein crown 32 may have a thickness "$t_1$"; inner rim 52 may have a thickness "$t_3$"; and outer rim 54 may have a thickness "$t_2$". Thicknesses $t_1$, $t_2$ and $t_3$ may be expressed as variables in terms of x, where x is the wall thickness of external conduit 10. In burners of the present disclosure, $t_1$ may range from about 0.5x to about 1x; $t_2$ may range from about 1x to about 2x; and $t_3$ may range from about 1x to about 2x, and x may range from about 1mm to about 10 mm, or from about 1mm to about 3mm, or about 2mm. For example, using x =2mm, thickness $t_1$ and may range from about 1mm to about 2mm; $t_2$ may range from 2mm-4mm; and $t_3$ may range from about 2mm-4mm. Circumferential concavity 50 may have a curvature orientation "A" that is substantially parallel to burner longitudinal axis "LB" in embodiment 200, but this is not necessary, as may be seen in embodiment 300 illustrated schematically in FIG. 6.

Embodiment 300 illustrated schematically in FIG. 6 offers a variation in which geometrical change forces the peak stress to shift to the rim regions 52, 54. In this geometric construction, and similar embodiments, a crack initiation spot is designed such that increased wall thicknesses $t_2$ and $t_3$ in the vicinity of rim portions 54, 52, respectfully, extends the crack propagation time. In this way, a considerable increase in the burner service life may be achieved. In embodiment 300, thicknesses $t_1$, $t_2$ and $t_3$ may have the ranges identified herein for embodiment 200. Circumferential concavity 50 may have a curvature orientation "A" that may have an orientation angle "α" with respect to burner longitudinal axis "LB" in embodiment 300, where angle α may range from 0 to about 45 degrees. Another curvature orientation "N" substantially normal to face region 58 of outer rim portion 54 may point at an orientation angle "β" away from a line "C" parallel to burner longitudinal axis LB. Angle β may range from about 30 to about 60 degrees, or from about 35 to about 55 degrees, or from about 40 to about 50 degrees. Any range within the broad range may be used, for example from about 31 to 59 degrees, or from about 42 to about 52degrees.

Melter apparatus in accordance with the present disclosure may also comprise one or more wall-mounted submerged combustion burners, and/or one or more roof-mounted burners (not illustrated). Roof-mounted burners may be useful to pre-heat the melter apparatus melting zones, and serve as ignition sources for one or more submerged combustion burners. Melter apparatus having only wall-mounted, submerged-combustion burners are also considered within the present disclosure. Roof-mounted burners may be oxy-fuel burners, but as they are only used in certain situations, are more likely to be air/fuel burners. Most often they would be shut-off after pre-heating the melter and/or after starting one or more submerged combustion burners. In certain embodiments, if there is a possibility of carryover of batch particles to the exhaust, one or more roof-mounted burners could be used to form a curtain to prevent particulate carryover. In certain embodiments, all submerged combustion burners are oxy/fuel burners (where "oxy" means oxygen, or oxygen-enriched air, as described earlier herein), but this is not necessarily so in all embodiments; some or all of the submerged combustion burners may be air/fuel burners. Furthermore, heating may be supplemented by electrical heating in certain embodiments, in certain melter zones..

Optionally, the burner tip crown and inner and outer walls may comprise the same or different corrosion resistant and fatigue resistant material, at least one of the corrosion and/or fatigue resistance being greater than material comprising the external conduit under conditions experienced during submerged combustion melting of glass-forming materials. Applicant's co-pending U.S. patent application Ser. No. 14/785,325 , filed Oct. 17, 2015 (published as US2016/0075586A1, Mar. 17, 2016, describes use of corrosion-resistant and/or fatigue resistant materials for the burner tip components connected to a dissimilar (and in certain embodiments, lower cost) material as the burner body, and methods of attachment. More particularly, at least one of the corrosion and/or fatigue resistance of the outer wall of the burner tip may be greater than material comprising the external conduit under conditions experienced during submerged combustion melting of glass-forming materials.

Burner tips may comprise same or different noble metals or other exotic corrosion and/or fatigue-resistant materials, such as platinum (Pt), ruthenium (Ru), rhodium (Rh), palladium (Pd), silver (Ag), osmium (Os), iridium (Ir), and gold (Au); alloys of two or more noble metals; and alloys of one or more noble metals with a base metal. As described in the above-mentioned 14/785,325 application, in certain embodiments the burner tip may comprise a platinum/rhodium alloy attached to the base metals comprising the burner body using a variety of techniques, such as brazing, flanged fittings, interference fittings, friction welding, threaded fittings, and the like, as further described herein with regard to specific embodiments. Threaded connections may eliminate the need for $3^{rd}$ party forgings and expensive welding or brazing processes —considerably improving system delivery time and overall cost. It will be understood, however, that the use of $3^{rd}$ party forgings, welding, and brazing are not ruled out for burners described herein, and may actually be preferable in certain situations.

When in alloyed form, alloys of two or more noble metals may have any range of noble metals. For example, alloys of two noble metals may have a range of about 0.01 to about 99.99 percent of a first noble metal and 99.99 to 0.01 percent of a second noble metal. Any and all ranges in between 0 and 99.99 percent first noble metal and 99.99 and 0 percent second noble metal are considered within the present disclosure, including 0 to about 99 percent of first noble metal; 0 to about 98 percent; 0 to about 97 percent; 0 to about 96; 0 to about 95; 0 to about 90; 0 to about 80; 0 to about 75; 0 to about 70; 0 to about 65; 0 to about 60; 0 to about 55; 0 to about 50; 0 to about 45, 0 to about 40; 0 to about 35; 0 to about 30; 0 to about 25; 0 to about 20; 0 to about 19; 0 to about 18; 0 to about 17; 0 to about 16; 0 to about 15; 0 to about 14; 0 to about 13; 0 to about 12; 0 to about 11; 0 to about 10; 0 to about 9; 0 to about 8; 0 to about 7; 0 to about 6; 0 to about 5; 0 to about 4; 0 to about 3; 0 to about 2; 0 to about 1; and 0 to about 0.5 percent of a first noble metal; with the balance comprising a second noble metal, or consisting essentially of a second noble metal (for example with one or more base metals present at no more than about 10 percent, or no more than about 9 percent base metal, or no more than about 8, or about 7, or about 6, or about 5, or about 4, or about 3, or about 2, or no more than about 1 percent base metal).

In certain noble metal alloy embodiments comprising three or more noble metals, the percentages of each individual noble metal may range from equal amounts of all noble metals in the composition (about 33.33 percent of each), to compositions comprising, or consisting essentially of, 0.01 percent of a first noble metal, 0.01 percent of a second noble metal, and 99.98 percent of a third noble metal. Any and all ranges in between about 33.33 percent of each, and 0.01 percent of a first noble metal, 0.01 percent of a second noble metal, and 99.98 percent of a third noble metal, are considered within the present disclosure.

The choice of a particular material is dictated among other parameters by the chemistry, pressure, and temperature of fuel and oxidant used and type of glass melt to be produced. The skilled artisan, having knowledge of the particular application, pressures, temperatures, and available materials, will be able design the most cost effective, safe, and operable burners for each particular application without undue experimentation.

The terms "corrosion resistant" and "fatigue resistant" as used herein refer to two different failure mechanisms that may occur simultaneously, and it is theorized that these failure mechanisms may actually influence each other in profound ways. It is preferred that the burner tips with circumferential concavities will have a satisfactory service life of at least 12 months under conditions existing in a continuously operating SCM, and it is especially preferred that they have a service life greater than 12 months.

Certain embodiments may comprise a burner tip insert shaped substantially the same as but smaller than the burner tip and positioned in an internal space defined by the burner tip, the insert configured so that a cooling fluid may pass between internal surfaces of the burner tip and an external surface of the insert. In these embodiments a first or distal end of the first internal conduit would be attached to the insert.

In certain embodiments, one or both of the inner and outer walls of the burner tip body may extend beyond the first end of the third internal conduit, at least partially defining a mixing region for oxidant and fuel.

Conduits of burner bodies and associated components (such as spacers and supports between conduits, but not burner tips) used in SC burners, SCMs and processes of the present disclosure may be comprised of metal, ceramic, ceramic-lined metal, or combination thereof. Suitable metals include carbon steels, stainless steels, for example, but not limited to, 306 and 316 steel, as well as titanium alloys, aluminum alloys, and the like. High-strength materials like C-110 and C-125 metallurgies that are NACE qualified may be employed for burner body components. (As used herein, "NACE" refers to the corrosion prevention organization formerly known as the National Association of Corrosion Engineers, now operating under the name NACE International, Houston, Texas.) Use of high strength steel and other high strength materials may significantly reduce the conduit wall thickness required, reducing weight of the burners.

Suitable materials for the glass-contact refractory, which may be present in SC melters and downstream flow channels, and refractory burner blocks (if used), include fused zirconia ($ZrO_2$), fused cast AZS (alumina-zirconia-silica), rebonded AZS, or fused cast alumina ($Al_2O_3$). The melter geometry and operating temperature, burner and burner tip geometry, and type of glass to be produced, may dictate the choice of a particular material, among other parameters.

The term "fluid-cooled" means use of a coolant fluid (heat transfer fluid) to transfer heat away from the burner exterior conduit and burner tip. Heat transfer fluids may be any gaseous, liquid, or some combination of gaseous and liquid compositions that functions or is capable of being modified to function as a heat transfer fluid. Gaseous heat transfer fluids may be selected from air, including ambient air and treated air (for example, air treated to remove moisture), inorganic gases, such as nitrogen, argon, and helium, organic gases such as fluoro-, chloro- and chlorofluorocarbons, including perfluorinated versions, such as tetrafluoromethane, and hexafluoroethane, and tetrafluoroethylene, and the like, and mixtures of inert gases with small portions of non-inert gases, such as hydrogen. Heat transfer liquids may be selected from liquids that may be organic, inorganic, or some combination thereof, for example, salt solutions, glycol solutions, oils and the like. Other possible heat transfer fluids include steam (if cooler than the expected glass melt temperature), carbon dioxide, or mixtures thereof with nitrogen. Heat transfer fluids may be compositions comprising both gas and liquid phases, such as the higher chlorofluorocarbons.

In certain embodiments of the present disclosure, burner tip 4 may be joined to burner body 6 using flanges. When joined in this way, critical design features are the thickness of the flange, the width of the flange, and the shape of the area surrounding the junction as this location is typically cooled with a coolant fluid and pressure drop needs to be minimized. In addition, when using flanges, careful selection of gasket material is necessary to ensure sealing and the ability to expose the flange to an oxygen or oxygen-enriched environment. In addition, or in certain alternative embodiments, plastically deformable features may be positioned on one or more of the flange faces to enable joint sealing.

In other embodiments, brazing compounds and methods may be used to attach burner tip 4 to burner body 6. Brazing allows the joining of dissimilar metals and also allows for repairs to be made by removing the braze material. For these embodiments to be successful, the mating surfaces must be parallel or substantially so, and of sufficient overlap to ensure that the brazing material can properly flow between the portions of the burner tip and burner body being joined. This may be achieved in certain embodiments using a flange at right angles to both the burner tip walls 28, 30, and the conduits forming burner body 6. In other embodiments brazing may be successfully achieved by making the burner tip walls 28, 30 and conduits 14, 10 overlap with sufficient gaps to allow brazing material to enter the gaps.

Braze compounds, sometimes referred to as braze alloys, to be useful in embodiments of the present disclosure, must have liquidus and solidus temperatures above the highest temperature of the burner tip. The highest temperature of the burner tip will be a temperature equal to the melt temperature existing in the SCM reduced by the flow of coolant through the burner tip, as well as by the flow of combustion gases through the burner tip. The highest temperature of the burner tip during normal operating conditions depends on the type of glass being made, which makes the selection of braze alloy not a simple matter. For Na—Ca—Si soda-lime window glass (Glass 1), typical melt temperature may range from about 1275° C. to about 1330° C.; for Al—Ca—Si E glass having low sodium and zero boron (Glass 2), the melt temperature may range from about 1395° C. to about 1450° C.; for B—Al—Si glass, zero sodium, zero potassium, high Si (Glass 3), the melt temperature may be about 1625° C.; and for B—Al—Ca—Si E glass used for reinforcement fiber (Glass 4), the melt temperature maybe about 1385° C. This information was taken from Rue, D., "Energy Efficient Glass Melting—The Next Generation Melter", p. 63, GTI Project Number 20621, March, 2008 (U.S. Dept. of Energy). Based on these temperatures, and assuming a drop in burner tip temperature of 300° C. due to coolant and gas flow through the burner tip without the protective cap, Table 1 lists the possible braze alloys that may be used.

TABLE 1

Braze Alloys

| Glass Type | Glass Melt T, (° C.) | Possible Braze Alloys[1] | Solidus T, (° C.)[2] |
|---|---|---|---|
| 1 | 1275-1330 | Pt | 1769 |
|  |  | Pd | 1555 |
|  |  | Ti | 1670 |
|  |  | Au/Pd (92/8, PALORO (BAU-8)) | 1200 |
|  |  | Ni/Pd (40/60, PALNI) | 1238 |
|  |  | Pd/Co (65/35, PALCO BPD-1) | 1219 |
|  |  | Pd/Ni/Au (34/36/30, PALNIRO 4 (AMS-4785)) | 1135 |
|  |  | Cu | 1083 |
|  |  | Au | 1064 |
| 2 | 1395-1450 | Pt | 1769 |
|  |  | Pd | 1555 |
|  |  | Ti | 1670 |
|  |  | Au/Pd (92/8, PALORO (BAU-8)) | 1200 |
|  |  | Ni/Pd (40/60, PALNI) | 1238 |
|  |  | Pd/Co (65/35, PALCO BPD-1) | 1219 |
| 3 | 1625 | Pt | 1769 |
|  |  | Ti | 1670 |
| 4 | 1385 | Pt | 1769 |
|  |  | Pd | 1555 |
|  |  | Ti | 1670 |
|  |  | Au/Pd (92/8, PALORO (BAU-8)) | 1200 |
|  |  | Ni/Pd (40/60, PALNI) | 1238 |
|  |  | Pd/Co (65/35, PALCO BPD-1) | 1219 |
|  |  | Pd/Ni/Au (34/36/30 PALNIRO 4 (AMS-4785)) | 1135 |

[1]PALORO, PALNI, and PALNIRO are registered trademarks, and PALCO is a trademark of Morgan Technical Ceramics and/or Morgan Advanced Ceramics, Inc.
[2]From Internet website of Morgan Technical Ceramics and The Morgan Crucible Company plc, England In yet other embodiments, burner tip walls and conduits 14, 10 may be threaded together, in certain embodiments accompanied by a sealant surface of flange upon which sealants, gaskets or O-rings may be present. Threaded joints may be straight or tapered such as NPT. In certain threaded embodiments the sealing surfaces of burner tip walls 28, 30 may be malleable enough compared to conduits 14, 10 to deform and form their own seals, without sealants, gaskets, or O-rings.

In still other embodiments, burner tip walls 28, 30 may be interference or "press" fit to their respective conduit 14, 10 of burner body 6. In these embodiments, the walls and/or conduits are machined to sufficiently close tolerances to enable deformation of one or both surfaces as the two parts are forcefully joined together.

In yet other embodiments, burner tip walls 28, 30 may be friction welded together.

In these embodiments, either the burner tip walls or burner body conduits, or both, may be spun and forced into contact until sufficient temperature is generated by friction to melt a portion of either or both materials, welding walls 28, 30 to conduits 14, 10, respectively. These embodiments may include one or more additional metals serving as an intermediate between walls 28, 30 and conduits 14, 10 to facilitate friction welding.

In using burners in SCMs of the present disclosure, a cooling fluid is made to flow through first and second annuli in the burner body, while flowing an oxidant or fuel into one or more inlet ports and through the third annulus defined by the second and third internal conduits, while either fuel or oxidant flows through the substantially concentric central third internal conduit. The burner body and burner tip body are configured such that flow of oxidant fuel causes the oxidant to intersect flow of the fuel in a mixing region at least partially defined by a generally central burner tip flow passage, combusting at least some of the fuel in the mixing region to form a flame and combustion products, and directing the flame and/or combustion products into solid and/or partially molten glass forming materials above the mixing region.

Burner tips described herein may be made using a variety of processes, including molding, machining, net-shape cast (or near-net shape cast) using rapid prototype (RP) molds and like processes. The matching or substantially matching burner tip inserts may similarly be RP molded and cast of the same or substantially similar shape, thereby ensuring proper cooling water velocity just under the surface of the burner tip material (inside the crown and inner and outer walls of the burner tips). Net-shape or near-net shape casting methods of making a variety of molds for producing a variety of complex products are summarized in patents assigned to 3D Systems, Inc., Rock Hill, S.C., U.S.A., for example U.S. Pat. No. 8,285,411.

In general, central internal conduit 15 may have an inner diameter (ID) ranging from about 1 inch up to about 5 inches (2.5 cm to 13 cm), or from about 2 inches up to about 4 inches (5 cm to 10 cm). Other conduits are sized accordingly.

The total quantities of fuel and oxidant used by burners of the present disclosure may be such that the flow of oxygen may range from about 0.9 to about 1.2 of the theoretical stoichiometric flow of oxygen necessary to obtain the complete combustion of the fuel flow. Another expression of this statement is that the combustion ratio may range from about 0.9 to about 1.2.

The velocity of the fuel in the various burner embodiments of the present disclosure depends on the burner geometry used, but generally is at least about 15 meters/second (m/s). The upper limit of fuel velocity depends primarily on the desired penetration of flame and/or combustion products into the glass melt and the geometry of the burner and burner tip; if the fuel velocity is too low, the flame temperature may be too low, providing inadequate temperature in the melter, which is not desired, and possible burner plugging, and if the fuel flow is too high, flame and/or combustion products might impinge on a melter wall or roof, or cause carryover of melt into the exhaust, or be wasted, which is also not desired. Similarly, oxidant velocity should be monitored so that flame and/or combustion products do not impinge on an SCM wall or roof, or cause carryover of melt into the exhaust, or be wasted. Oxidant velocities depend on fuel flow rate and fuel velocity, but in general should not exceed about 200 ft/sec at 400 scfh flow rate. The pressure in mixing region 150 of burners in accordance with the present disclosure should not exceed about 10 psig (170 kPa absolute pressure).

Additionally, certain burner embodiments of this disclosure may also be provided with stabilization of the flame with an auxiliary injection of fuel and/or oxidant gases. For example, a portion of the oxidant may be premixed with fuel as a primary oxidant, usually air, in conduit 15, in addition to a secondary or tertiary oxidant injection in the third annulus.

SC burners and methods of the present disclosure are intended to be used, for example, to replace combustion burners in existing SCMs, and/or to be used as the main source of energy in new SCMs.

Certain SCMs and method embodiments of this disclosure may include fluid-cooled panels such as disclosed in Applicant's U.S. patent application Ser. No. 12/817,754, filed Jun. 17, 2010, now U.S. Pat. No. 8,769,992, issued Jul. 8, 2014. In certain system and process embodiments, the SCM may include one or more adjustable flame submerged combustion burners comprising one or more oxy-fuel combustion burners, such as described in Applicant's U.S. patent application Ser. No 13/268,028, filed Oct. 7, 2011, now U.S. Pat. No. 8,875,544, issued Nov. 4, 2014. In certain systems and processes, the SCM may comprise a melter exit structure designed to minimize impact of mechanical energy, such as described is Applicant's U.S. patent application Ser. No. 13/458,211, filed Apr. 27, 2012, now U.S. Pat. No. 9,145,319, issued Sept. 29, 2015. In certain systems and processes, the flow channel may comprise a series of sections, and may comprise one or more skimmers and/or impingement (high momentum) burners, such as described in Applicant's U.S. patent application Ser. No 13/268,130, filed Oct. 7, 2011, now U.S. Pat. No. 9,021,838 issued May 5, 2015; Ser. No. 13/493,170, filed Jun. 11, 2012, now U.S. Pat. No. 8,707,739, issued Apr. 29, 2014; and reissue Application Ser. No. 14/807 494 filed July 23, 2015. Certain systems and processes of the present disclosure may utilize measurement and control schemes such as described in Applicant's patent application Ser. No. 13/493,219, filed Jun. 11, 2012, now U.S. Pat. No. 9,096,453, issued Aug. 4, 201.5, and/or feed batch densification systems and methods as described in Applicant's co-pending application Ser. No. 13/540,704, filed Jul. 3, 2012. Certain SCMs and processes of the present disclosure may utilize devices for delivery of treating compositions such as disclosed in Applicant's patent application Ser. No. 13/633,998, filed Oct. 3, 2012, now U.S. Pat. No. 8,973,405, issued Mar. 10, 2015.

Although only a few exemplary embodiments of this disclosure have been described in detail above, those skilled in the art will readily appreciate that many modifications are possible in the exemplary embodiments without materially departing from the novel teachings and advantages of this disclosure. Accordingly, all such modifications are intended to be included within the scope of this disclosure as defined in the following claims. In the claims, no clauses are intended to be in the means-plus-function format allowed by 35 U.S.C. §112, Section F, unless "means for" is explicitly recited together with an associated function. "Means for" clauses are intended to cover the structures, materials, and acts described herein as performing the recited function and not only structural equivalents, but also equivalent structures.

What is claimed is:

1. A fluid-cooled submerged combustion burner comprising:
a burner body (6) comprising an external conduit (10) and a first internal conduit (12) substantially concentric therewith, and positioned internal of the external conduit (10), the external conduit (10) comprising a first end, a second end, and a longitudinal bore (LB) having a longitudinal axis, the first internal conduit (12) comprising a first end, a second end, and a longitudinal bore having a longitudinal axis, and a second internal conduit (14) substantially concentric with, and positioned internal of the first internal conduit, the second internal conduit (14) comprising a first end, a second end, and a longitudinal bore having a longitudinal axis, the external conduit (10) and first internal conduit (12) forming a first annulus (11) there between for passing a cooling fluid, the first internal conduit (12) and the second internal conduit (14) forming a second annulus (13) there between for passing the cooling fluid, and a third internal conduit (15) configured to form a third annulus between the second (14) and third (15) internal conduits, the burner body comprising fuel and oxidant inlet ports near the second ends of the conduits; and
a burner tip (4) defined by an inner wall (28) and an outer wall (30) connected via a crown (32), the burner tip inner wall (28) and outer wall (30) are parallel to the longitudinal axis, the crown (32) having an arcuate interior surface configured to be cooled by a coolant fluid and an arcuate exterior surface configured to face material being melted by submerged combustion, the outer wall (30) removably fixed to the first end of the external conduit (10) via an outer connection, and the inner wall (28) removably fixed to the first end of the second internal conduit (14) via an inner connection, the burner tip (4) comprising a generally central burner tip flow passage configured to pass a combustible mixture therethrough, the generally central burner tip flow passage defined by the inner wall (28);
wherein the arcuate exterior surface of the burner tip crown (32) comprises a first arcuate portion defining a symmetrical circumferential concavity (50) having a curvature orientation (A) defining an orientation angle ($\alpha$) between the longitudinal axis of the longitudinal bore of the external conduit and a first line that is normal to a tangent line at a vertex of the symmetrical circumferential concavity, orientation angle ($\alpha$) ranging from 0 degrees to about 45 degrees as measured in longitudinal cross-section, and second and third arcuate portions defining inner and outer crown rims (52, 54), at least the outer crown rim (54) extending above the circumferential concavity (50); and
the crown (32) having a thickness ($t_1$) measured in longitudinal cross-section on the first line, and from the first arcuate portion of the exterior surface to the arcuate interior surface of the crown (32), that is less than thicknesses ($t_3$, $t_2$), where
($t_3$) is measured in the longitudinal cross-section on a second line that is normal to a tangent line of a vertex of the second arcuate portion of the exterior surface defining inner rim (52) to the arcuate interior surface of the crown (32), and ($t_2$) is measured in the longitudinal cross-section on a third line that is normal to a tangent line of a vertex of the third arcuate portion of the exterior surface defining outer rim (54) to the arcuate interior surface of the crown (32).

2. The fluid-cooled submerged combustion burner of claim 1 wherein the third arcuate portion of the exterior surface defining the outer rim faces generally away from the symmetrical circumferential concavity at an orientation angle "β" between the longitudinal axis of the longitudinal bore of the external conduit and a fourth line that is normal to a tangent line at a vertex of the third arcuate portion of the exterior surface of crown (32).

3. The fluid-cooled submerged combustion burner of claim 2 wherein the orientation angle β ranges from about 30 degrees to about 60 degrees.

4. The fluid-cooled submerged combustion burner of claim 1 wherein the crown and inner and outer walls comprise the same or different corrosion resistant and fatigue resistant material, at least one of the corrosion and/or fatigue resistance being greater than material comprising the external conduit under conditions experienced during submerged combustion melting of glass-forming materials, the corrosion resistant and fatigue resistant material selected from the group consisting of noble metals, alloys of two or more noble metals, alloys of one or more base metals with one or more noble metals, copper, copper alloys, and combinations and alloys thereof.

5. A submerged combustion melter comprising:
a floor, a roof, and a sidewall structure connecting the floor and roof defining an internal space, at least a portion of the internal space comprising a melting zone; and
one or more combustion burners in either the floor, the roof, the sidewall structure, or any two or more of these, producing combustion gases and configured to emit the combustion gases from a position under a level of, and positioned to transfer heat to and produce, a turbulent molten mass of glass in the melting zone;
at least one of the combustion burners being a fluid-cooled submerged combustion burner of claim 4.

6. A submerged combustion melter comprising:
a floor, a roof, and a sidewall structure connecting the floor and roof defining an internal space, at least a portion of the internal space comprising a melting zone; and
one or more combustion burners in either the floor, the roof, the sidewall structure, or any two or more of these, producing combustion gases and configured to emit the combustion gases from a position under a level of, and positioned to transfer heat to and produce, a turbulent molten mass of glass in the melting zone;
at least one of the combustion burners being a fluid-cooled submerged combustion burner of claim 1.

7. A submerged combustion melter comprising:
a floor, a roof, and a sidewall structure connecting the floor and roof defining an internal space, at least a portion of the internal space comprising a melting zone; and
one or more combustion burners in either the floor, the roof, the sidewall structure, or any two or more of these, producing combustion gases and configured to emit the combustion gases from a position under a level of, and positioned to transfer heat to and produce, a turbulent molten mass of glass in the melting zone;
at least one of the combustion burners being a fluid-cooled submerged combustion burner of claim 2.

8. The fluid-cooled submerged combustion burner of claim 1 wherein the thickness ($t_1$) ranges from about 1 mm to about 2 mm; the thickness ($t_2$) ranges from about 2 mm to about 4 mm; and the thickness ($t_3$) ranges from about 2 mm to about 4 mm.

9. A submerged combustion melter comprising:
a floor, a roof, and a sidewall structure connecting the floor and roof defining an internal space, at least a portion of the internal space comprising a melting zone; and
one or more combustion burners in either the floor, the roof, the sidewall structure, or any two or more of these, producing combustion gases and configured to emit the combustion gases from a position under a level of, and positioned to transfer heat to and produce, a turbulent molten mass of glass in the melting zone;
at least one of the combustion burners being a fluid-cooled submerged combustion burner of claim 8.

10. A method of producing molten glass comprising feeding glass-forming materials to the submerged combustion melter of claim 6, feeding an oxidant and a fuel to the burner, combusting the fuel and oxidant, and melting the glass-forming materials to produce molten glass.

11. The method of claim 10 comprising:
flowing an oxidant into the one or more oxidant inlet ports and through the third annulus;
flowing a fuel into the one or more fuel inlet ports in the third internal conduit, the burner body and burner tip body configured such that flow of oxidant out of the third annulus and flow of fuel out of the third internal conduit causes the oxidant to intersect flow of the fuel in a mixing region at least partially defined by the generally central burner tip flow passage;
combusting at least some of the fuel in the mixing region to form a flame and combustion products; and
directing the flame and combustion products into solid and/or partially molten glass forming materials above the mixing region.

12. The method of claim 11 wherein the oxidant is an oxygen stream comprising at least 90 mole percent oxygen.

13. The method of claim 10 comprising:
flowing a fuel into the one or more fuel inlet ports and through the third annulus;
flowing an oxidant into the one or more oxidant inlet ports and through the third internal conduit, the burner body and burner tip body configured such that flow of oxidant out of the third internal conduit and flow of fuel out of the third annulus causes the oxidant to intersect flow of the fuel in a mixing region at least partially defined by the generally central burner tip flow passage;
combusting at least some of the fuel in the mixing region to form a flame and combustion products; and
directing the flame and combustion products into solid and/or partially molten glass forming materials above the mixing region.

14. The method of claim 13 wherein the oxidant is an oxygen stream comprising at least 90 mole percent oxygen.

15. A method of producing molten glass comprising feeding glass-forming materials to the submerged combustion melter of claim 7, feeding an oxidant and a fuel to the burner, combusting the fuel and oxidant, and melting the glass-forming materials to produce molten glass.

16. A method of producing molten glass comprising feeding glass-forming materials to the submerged combustion melter of claim 5, feeding an oxidant and a fuel to the burner, combusting the fuel and oxidant, and melting the glass-forming materials to produce molten glass.

17. A method of producing molten glass comprising feeding glass-forming materials to the submerged combustion melter of claim 9, feeding an oxidant and a fuel to the burner, combusting the fuel and oxidant, and melting the glass-forming materials to produce molten glass.

* * * * *